UNITED STATES PATENT OFFICE.

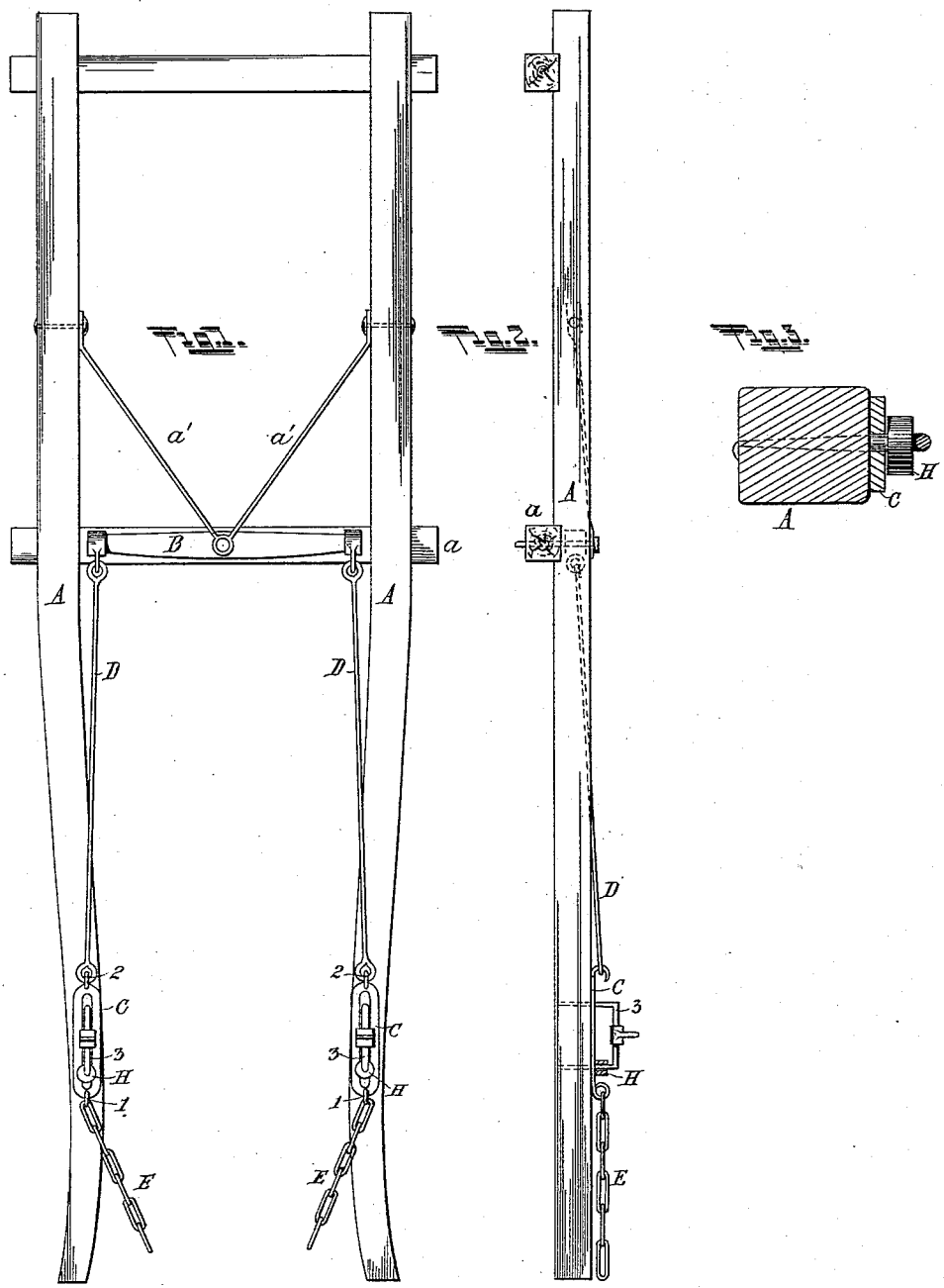

WILLIAM A. FRY, OF WASHINGTON, DISTRICT OF COLUMBIA.

DRAFT-EQUALIZER FOR VEHICLES.

SPECIFICATION forming part of Letters Patent No. 379,215, dated March 13, 1888.

Application filed June 21, 1886. Renewed July 21, 1887. Serial No. 244,945. (No model.)

*To all whom it may concern:*

Be it known that I, WILLIAM A. FRY, of Washington, in the District of Columbia, have invented certain new and useful Improvements in Draft-Equalizers for Carts and other Vehicles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to special improvements, hereinafter fully described, in devices for attaching animals—such as horses, mules, &c.—to carts or other two-wheeled vehicles, so as to equalize the pressure of the collar or draft of the animal's shoulders at times, whether the vehicle be loaded or not, and when the animal is walking, and also when turning to the right or left. I attain this object by the special appliance illustrated in the accompanying drawings, in which—

Figure 1 is a top view of a pair of cart-shafts with my improvement or novel appliance shown in place. Fig. 2 is a side view of the same, and Fig. 3 is an enlarged view showing a section of the shaft.

A A are a pair of cart-shafts as ordinarily used.

B is a whiffletree attached in any desirable manner to the center of the cross-piece $a$. This may be accomplished by means of a bolt passing through the whiffletree B and cross-piece $a$, as shown. This bolt may be further strengthened by stays $a'$ $a'$.

C C are sliding bars, the front of each of which is formed with an eye, 1, to attach the tug or trace chains. At the other end or rear of each of these slides is also formed an eye or hook, 2, to take the connecting-trace D, which extends from the whiffletree B to the sliding bar C. This rear hook, 2, may also serve to fasten the breeching to.

E E are tug-chains for connecting the slide-bars C to the hames of the horse-collar.

The sliding bars C are so formed that they will fit over the staples 3, generally fastened to the shafts to carry the back band or chain. The slide-bars should so fit as to allow little or no lateral play or movement, but yet to be capable of sliding lengthwise of the shafts about two inches backward and forward. The object of these sliding bars is to enable the animal harnessed to the cart or other vehicle to have full control (by pulling direct on the shafts) of guiding the vehicle and at the same time derive the benefit occurring from the action of a whiffletree by relieving the pressure from the movement of the shoulders. These sliding bars are so formed that the sliding or movement allowed does not amount to more than the movement of the animal's shoulders in the collar when walking—say about two inches—and thereby also enabling the animal to bring all of its power to bear upon one shaft, if necessary, as in turning or pulling out of a hole. These bars are prevented from lifting by a loose collar, H, placed on the staple. I prefer to form and use these sliding bars as shown on the drawings; but they may be made of any desired form in cross-section—such as half-round or square—and may be attached to the shafts by staples driven into or screwed to the shafts. They may also in some cases be formed in one piece with the connecting-traces.

Ordinary carts have no singletree. In carts having merely a singletree and chain-traces the animal has no control to guide the cart, because his pull is concentrated always at the center of the singletree and he has but little leverage in getting a cart out of a rut or over an obstruction. It will be seen, however, that my invention overcomes this in a simple, cheap, and efficient manner by resisting the degrees to which the singletree can turn on its axis, such restriction being caused by the slides, which have a limited lengthwise movement, and by thus permitting but a small range of motion of the whiffletree on its axis they transfer the power or pull from the singletree to the shaft, near its forward end, and at a point where it is found best to hook the horse, and the shaft thereby becomes a long lever for turning the cart, being in this respect as efficient as the ordinary cart made without any singletree.

The advantage of the singletree in connection with the slides having the limited range of motion is that the slides allow the horse-collar to move sufficiently to adjust itself to the movement of the horse's shoulders during every step of his walking or working.

My device has the further advantage that it can be put on any ordinary cart very cheaply by any boy or cart-driver and without cutting, slotting, or weakening the shafts, and is not complicated. The slotted slide-pieces may be fitted over and held and guided by the ordinary staples used for the "back-band," and are not in any wise connected to such band, and this band may be connected to the staple in the usual way, so that my devices and their free action are entirely independent of any swaying or sliding motion of the back-band due to the movements of the animal. The slots in these slides being longer than the staple or device which limits their longitudinal play, they can be pulled forward as far only as their slots permit, and when either one is pulled to the extent of its movement any further pull ceases to act on the whiffletree, but is then necessarily all upon its staple or device which holds such slide, thus transferring the pull to that point, and the whole vehicle structure is then as if solid, and the animal can pull it around easily, having the full advatage of all the leverage of the shafts, the point of contact with the earth of the wheel on the other side of the vehicle constituting at that stage substantially a pivotal point for the turning of the vehicle.

I claim—

1. As an attachment for vehicles for equalizing the draft, the combination, with the staples on the shafts, of slotted slide-bars C C, fitting loosely around such staples, and rods or traces D D for connecting such slotted bars to the whiffletree.

2. In combination with the shafts, the slide-bars having a predetermined limited range of movement, and the traces D, connected thereto and to the whiffletree, the latter having also a limited range of movement on its axis determined by the movement of the slide-bars.

WILLIAM A. FRY.

Witnesses:
 WILL T. NORTON,
 M. A. BALLINGER.